(12) United States Patent
Buchstaller et al.

(10) Patent No.: US 11,705,732 B2
(45) Date of Patent: Jul. 18, 2023

(54) STORAGE DEVICE FOR STORING ELECTRICAL ENERGY

(71) Applicant: Siemens Aktiengesellschaft, Munich (DE)

(72) Inventors: Dominic Buchstaller, Friedrichshafen (DE); Michael Grillenberger, Bayern (DE); Andreas Kiepfer, Bavaria (DE); Elias Kyrlies-Chrysoulidis, Nuremberg (DE); Friedemann Paulini, Oberasbach (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 347 days.

(21) Appl. No.: 16/979,785

(22) PCT Filed: Mar. 5, 2019

(86) PCT No.: PCT/EP2019/055367
§ 371 (c)(1),
(2) Date: Sep. 10, 2020

(87) PCT Pub. No.: WO2019/174962
PCT Pub. Date: Sep. 19, 2019

(65) Prior Publication Data
US 2021/0044126 A1   Feb. 11, 2021

(30) Foreign Application Priority Data
Mar. 14, 2018 (DE) .................... 10 2018 203 878.3

(51) Int. Cl.
*H02J 3/32* (2006.01)
*H02J 7/00* (2006.01)

(52) U.S. Cl.
CPC ............. *H02J 3/32* (2013.01); *H02J 7/00045* (2020.01); *H02J 7/0068* (2013.01); *H02J 2207/20* (2020.01)

(58) Field of Classification Search
CPC ....... H02J 3/32; H02J 2207/20; H02J 7/00045
See application file for complete search history.

(56) References Cited

U.S. PATENT DOCUMENTS

| 10,529,973 B2 * | 1/2020 | Yau ........................ H02J 7/0042 |
| 2014/0180968 A1 | 6/2014 | Song ....................... G01D 4/002 |

(Continued)

FOREIGN PATENT DOCUMENTS

| WO | 2015 027215 | 2/2015 | ............ H01M 10/42 |

OTHER PUBLICATIONS

Search Report for International Application No. PCT/EP2019/055367, 10 pages, dated May 23, 2019.

*Primary Examiner* — Richard V Muralidar
(74) *Attorney, Agent, or Firm* — Slayden Grubert Beard PLLC

(57) ABSTRACT

Various embodiments include a storage device for electrical energy, the device comprising: a rechargeable battery; two terminals to connect the battery to at least one of: a supply network, an electrical load, and/or an electrical generator; a control unit to control charging and discharging of the battery; a communication interface configured to provide wireless data access; and a display of machine-readable code including authentication data enabling wireless data access.

18 Claims, 1 Drawing Sheet

(56) References Cited

U.S. PATENT DOCUMENTS

2016/0197337 A1\* 7/2016 Yau ................... H01M 10/425
                                                           429/7
2016/0198536 A1  7/2016 Britt ...................... H05B 33/08

\* cited by examiner

— 1 —

STORAGE DEVICE FOR STORING ELECTRICAL ENERGY

CROSS-REFERENCE TO RELATED APPLICATIONS

This application is a U.S. National Stage Application of International Application No. PCT/EP2019/055367 filed Mar. 5, 2018, which designates the United States of America, and claims priority to DE Application No. 10 2018 203 878.3 filed Mar. 14, 2018, the contents of which are hereby incorporated by reference in their entirety.

TECHNICAL FIELD

The present disclosure relates to electrical energy storage. Various embodiments of the teachings herein include storage devices for storing electrical energy, e.g., in domestic applications, comprising an energy store, in particular a battery, terminals for connecting the energy store to a supply network and/or to an electrical load, and a control unit to control the state of charge of the energy store, and a method for commissioning a storage device of this type.

BACKGROUND

During the set-up or commissioning of a storage device for storing electrical energy, in particular for domestic applications, it is necessary to perform settings. These settings include, inter alia, an installed photovoltaic power of a photovoltaic installation to which the storage device is connected, a reactive power setting (depending on the electricity supply company) and KfW [Credit Loan Corporation] and EEG [Renewable Energy Law] settings. Further settings relate to the storage capacity and their characteristics, such as the number of batteries and parameters. These are typically performed with PC systems which are connected to the storage device in situ by means of an interface such as a USB or other serial interfaces.

SUMMARY

The teachings of the present disclosure include storage devices in which more flexible commissioning is enabled. Additional embodiments include methods for commissioning a storage device of this type. For example, some embodiments include a storage device (100) for storing electrical energy, particularly in domestic applications, comprising: an energy store, in particular a rechargeable battery, terminals to connect the energy store to a supply network (112) and/or to an electrical load (110) and/or to an electrical generator (108), a control unit to control charging and discharging processes of the energy store, characterized in that the storage device comprises a communication interface (106) which is designed to provide wireless data access, in particular to form a wireless access point, the storage device comprises a machine-readable code (104), in particular a QR code (104), or is designed to generate a machine-readable code (104) on a display screen, wherein the machine-readable code comprises authentication data to enable the wireless data access.

In some embodiments, the machine-readable code (104) is applied or fitted in physical form on the storage device (100), in particular as an imprint.

In some embodiments, the machine-readable code (104) is presentable on a display screen of the storage device and is stored in a store of the control unit, or the control unit is designed to calculate the machine-readable code (104) from data stored in the data store.

In some embodiments, the machine-readable code (104) is part of a handbook or is designed for attachment in the immediate vicinity of the installation site of the storage device.

In some embodiments, the control unit is designed, following authentication of a data processing device (204), in particular a mobile terminal device (204), in particular a smartphone (204) or tablet, to receive and store account information for a user account from the data processing device (204).

In some embodiments, the control device is designed, following authentication of the data processing device (204), to receive settings for accessing a further data network or data system, in particular a WLAN and/or a cloud service (206), from the data processing device (204).

In some embodiments, the control device is designed, after accessing the further data network (206), to make operational data available in the further data network (206).

In some embodiments, there is a rectifier to connect the energy store to an electrical supply network (112).

As another example, some embodiments include a method for commissioning a storage device (100) for storing electrical energy, particularly in domestic applications, comprising: providing a wireless data access, in particular a Wi-Fi access point, by means of the storage device (100); providing a machine-readable code (104), in particular a QR code (104), by means of or in the energy storage device, wherein the machine-readable code (104) comprises authentication data to enable the wireless data access; reading the machine-readable code (104) with a data processing device (204), in particular with a mobile terminal device (204), in particular a smartphone (204) or tablet, and extracting the authentication data from the read machine-readable code (104); and connecting the data processing device (204) to the wireless data access.

In some embodiments, the method includes following the connection of the data processing device (204) to the wireless data access, account information for a user account (208) is transferred from the data processing device (204) to the storage device (100).

In some embodiments, the reading of the machine-readable code (104), the extraction of the authentication data, the connection of the data processing device (204) to the wireless data access and the transfer of account information are performed by a single app on the data processing device (204)

In some embodiments, a user enters the account information for the user account in the app.

In some embodiments, the storage device (100) sets up a connection to a cloud service (206) using the account information and transfers operational data to the cloud service (206).

BRIEF DESCRIPTION OF THE DRAWINGS

Various example designs of the storage device are described herein. The teachings are explained in further detail below on the basis of example embodiments with reference to the drawing, in which, in each case in schematic form.

DETAILED DESCRIPTION

Figure 1:
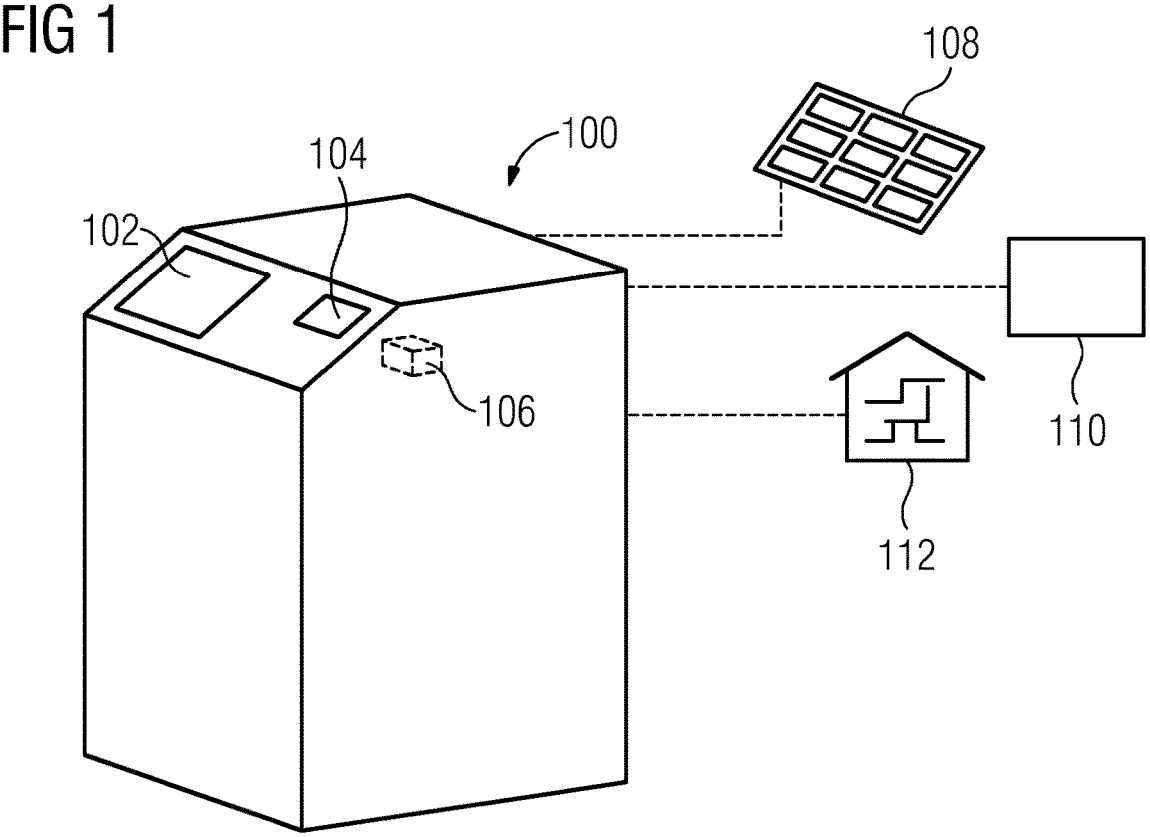
FIG. 1 shows a storage device incorporating teachings of the present disclosure.

In some embodiments, a storage device incorporating teachings of the present disclosure is designed to store electrical energy. The storage device can be used, in particular, in domestic applications. It comprises an energy store, for example a rechargeable battery, and terminals to connect the energy store to a supply network and/or to an electrical load and/or to an electrical generator. The storage device further comprises a control unit to control charging and discharging processes of the energy store.

The storage device further has a communication interface. This interface is designed to provide wireless data access. The wireless data access can comprise, for example, a wireless access point. Finally, the storage device comprises a machine-readable code, in particular a QR code, or it is designed to generate a machine-readable code on a display screen. The machine-readable code contains authentication data to enable the wireless data access.

In some embodiments, there is a method for commissioning a storage device for storing electrical energy, particularly in household applications, comprises the following steps:

providing a wireless data access, in particular a Wi-Fi access point, by means of the storage device;

providing a machine-readable code, in particular a QR code, by means of or in the energy store, wherein the machine-readable code comprises authentication data to enable the wireless data access;

reading the machine-readable code with a data processing device, in particular with a mobile terminal device, in particular a smartphone or tablet, and extracting the authentication data from the read machine-readable code; and connecting the data processing device to the wireless data access.

The storage device may, for example, be a typical battery for domestic or domestic-related applications, for example a storage device which can be used for the temporary storage of photovoltaic installations connected to the building. The storage capacity of an installation of this type may, for example, be in the range from 1 kWh to 100 kWh, in particular from 5 kWh to 25 kWh.

The term "battery" means a battery which is rechargeable and dischargeable multiple times, i.e. an accumulator, typically with electrochemical energy storage, for example Li-ion batteries or lead batteries. The energy store is connectable to an electrical supply network, for example a 400 V local network. In some embodiments, the energy store is connected to an electrical load, such as, for example, installations in a domestic environment. The connection is typically not direct, but is established via a local network such as the building's electricity supply. In some embodiments, the energy store is connected to an electrical generator, for example a photovoltaic installation. The energy store can be designed to take in and store electrical energy of the generator and output it on demand to the load or into the supply network.

The communication interface and the control device can be provided as separate devices or as a common device which is implemented, for example, by a single microprocessor with suitable peripheral equipment.

The authentication data can comprise information in order to be able to uniquely identify the device, for example the serial number. In some embodiments, the authentication data or, in particular, the machine-readable code also, can exclusively comprise the serial number. In addition, however, further authentication data can also be present. The machine-readable code can further comprise an encryption in order to achieve increased security.

Advantageous designs of a storage device incorporating teachings of the present disclosure are described in the various embodiments. The features described therein can be combined with the features of other embodiments. In some embodiments, the following features can additionally be provided:

the machine-readable code can be applied or attached in physical form to the storage device. The machine-readable code can be applied, for example, as an imprint or label to the storage device;

the machine-readable code can further be presentable on a display screen of the storage device and can be stored in a data store of the control unit. As an alternative to the graphical storage, the control unit can be designed to calculate the code from data stored in the data store and to display the calculated code;

the machine-readable code can be part of a handbook or can be designed for attachment in the immediate vicinity of the installation site of the storage device. The machine-readable code can thus be present as a label which is provided for attachment in the immediate vicinity of the energy store. In this case, the machine-readable code is a mandatory part of the delivery contents of an energy store;

the communication interface can be designed, following authentication of a data processing device, in particular a mobile terminal device, in particular a smartphone or tablet, to receive and store account information for a user account from the data processing device;

the communication interface can be designed, following authentication of the data processing device to receive settings from the data processing device for accessing a further data network or data system, in particular a WLAN and/or a cloud service;

the communication interface can be designed, following access to the further data network, to provide operational data in the further data network;

a power converter can be connected between the energy store and the supply network, the load and/or the generator. The power converter performs the conversion of the DC voltage of the energy store into a single-phase or three-phase AC voltage. The power converter further performs a conversion of an AC voltage into a DC voltage for the energy store. If the energy store is connected to a DC network or to a photovoltaic installation or other DC voltage loads or generators, the power converter can also be a DC voltage converter or a plurality of power converters can be provided. In some embodiments, the control device also controls the power converter;

following the connection of the data processing device to the wireless data access, account information for a user account can be transferred from the data processing device to the storage device, where after this account information can remain stored, for example, in a data store of the storage device;

the reading of the machine-readable code, the extraction of the authentication data, the connection of the data processing device to the wireless data access and the transfer of account information can be performed by a single app, i.e. a single program, on the data processing device;

for this purpose, the app can be designed to record the account information for the user account through input by a user, and to store said information on the data processing device;

the storage device can set up a connection to a cloud service using the account information and pre-installed certificates, and can transfer operational data to the cloud service;

the storage device can be designed to transmit error messages relating to set-up errors or device errors, for example incorrect configuration data, to the cloud service. From there, the app user can advantageously view the error messages regardless of his location.

FIG. 1 shows a simplified representation of a storage device 100 for storing electrical energy incorporating teachings of the present disclosure. In this example, the storage device 100 is connected to a photovoltaic installation 108 whose power is taken in and temporarily stored by the storage device. In other embodiments, the storage device 100 can also be connected to other generators, such as, for example, wind power installations, which also exist on a domestic scale.

The storage device 100 is further connected to the 400 V local network 110 as a supply network. The storage device 100 can output the stored energy to the local network, for example if the price for a feed-in of this type is high enough.

Finally, in this example, the storage device 100 is connected to an in-house supply network 112. The in-house supply network 112 can belong to a dwelling such as a single family house or an apartment block, but also to an office building or public building. In this example, the in-house network is the normal 400 V building wiring wherein, in this case, the connection to the in-house network can be redundant in relation to the connection to the supply network. In other example embodiments, the in-house network can be a DC network, for example with a 12 V voltage. This network would not be connected directly to the local network, but only via a correspondingly designed rectifier. The storage device 100 can similarly be connected to the DC network, wherein an interposed DC/DC converter is expedient. The DC/DC converter can in turn form part of the storage device 100 and can also be controlled by its control device (not shown in FIG. 1).

The storage device 100 comprises a control panel 102 which can comprise, for example, a display screen and control elements. However, the control elements can also be implemented as soft buttons which are presented via software on the display screen. The storage device 100 further comprises a communication interface 106. This is designed to provide a WLAN (wireless local area network) access point, i.e. wireless data access, which can be used by devices which are equipped with a WLAN interface. Devices of this type are, for example, smartphones 204 or tablets. The wireless data access is secured, for example, with Wi-Fi protected access (WPA or WPA2), so that access is possible only with knowledge of the corresponding password.

The storage device 100 further comprises a QR code 104 attached near to the control panel 102. The QR code 104 contains the authentication data as coded data for the wireless data access of the communication interface 106. These authentication data can contain, for example, the WPA password (key) and the radio network names of the WLAN (service set identifier SSID).

Further options are also available for attaching the QR code as well as attaching it to the surface of the device. The QR code can be applied, for example glued, or imprinted, inside the storage device 100, wherein access is enabled, for example, by opening a flap. The QR code 104 can further be affixed on a separate carrier, for example on a card. The card can, for example, be removably accommodated in the storage device 100 and can thus indirectly be a physical part of the storage device 100. The QR code can similarly be contained, for example, in or on a handbook or other delivery contents provided with the storage device 100. In other words, the statement that the storage device 100 comprises the QR code 104 means that the QR code 104 is available in the immediate vicinity of the storage device 100.

A different machine-readable code, for example a development of the QR code such as the secure QR code or an alternative machine-readable code such as the Aztec code, can also be used as an alternative to a QR code 104. The machine-readable code does not have to be two-dimensional.

Figure 2:
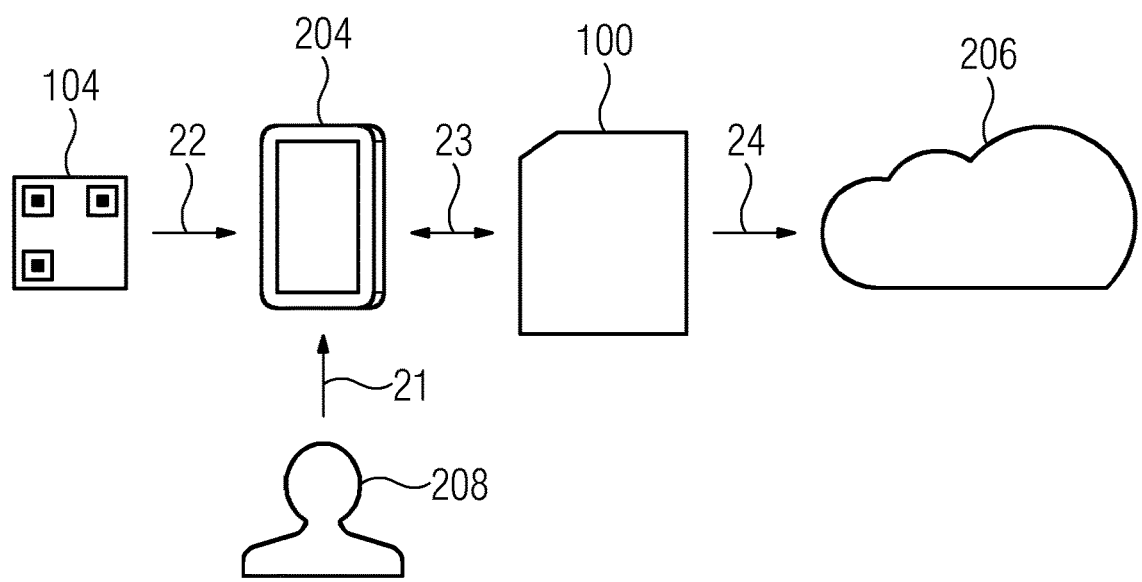
FIG. 2 shows a flow diagram for a method incorporating teachings of the present disclosure used for commissioning of a storage device.

FIG. 2 is a flow diagram of an example method for commissioning the storage device 100. In this process, a user uses a smartphone 204 to commission and set up the storage device 100. In some embodiments, the user has previously installed and configured an app on the smartphone 204. Once the mobile app has been set up, the user enters user data 208 into the app in a first step 21, wherein the user data 208 comprise a username, also referred to as a login, and a password. During this registration, the user can store further personal information, such as, for example, an address or contact details. In this example, he must also accept general terms and conditions (Ts&Cs), for which purpose a display area or link to the Ts&Cs is provided in the app.

A commissioning/pairing process is used in order to unite the energy store 100 and the app with the now available user data 208. For this purpose, in a second step 22, the user scans the QR code 104 on the energy store 100 with the camera of the smartphone 204.

Following successful scanning of the QR code 104, the authentication data for the wireless data access are extracted from the QR code 104 by the smartphone 204. In a third step 23, the authentication data are used to set up a WLAN connection between the smartphone 204 and the storage device 100. Once this connection is set up, the user data 208 are transferred from the smartphone 204 to the storage device 100.

In a fourth step 24, the storage device 100 connects via the Internet to a cloud service 206. To do this, the storage device 100 uses the user data 208 for authentication. The user data 208 can therefore be or comprise, in particular, data for connecting to an existing (home) WLAN. If this procedure is successful, the user receives feedback indicating that the store is successfully connected to the cloud service 206.

If an error occurs during the commissioning, feedback to the app on the smartphone 204 is expedient. The user thereby receives an error message, for example the instruction "The Internet connection of the storage device must be checked." The user may have the option to jump back and forth at any time between the individual commissioning steps 21 . . . 24 in the sense of a previous/next function. The error message may be transmitted here from the energy store 100 to the cloud service 262 which the smartphone 204 in turn accesses.

In short, the energy store 100 is therefore switched to an access point mode at the beginning of the commissioning. While the mobile application on the smartphone 204 is wirelessly connected to the access point, settings can be performed following the scanning of the device-specific QR code 104. In this mode, a mobile application is thus able to connect to the energy store 100 and set values there, such as, for example, the setting of access data for a Wi-Fi network. During the commissioning, the account, i.e. the user data 208, is mapped onto the device. On completion of the commissioning, the system switches automatically to the "normal" operating mode and connects via the Wi-Fi network to the cloud service 206. Measured values of the energy store 100 are now available online for the user.

What is claimed is:

1. A storage device for electrical energy, the device comprising:
   a rechargeable battery;
   two terminals to connect the battery to at least one of: a supply network, an electrical load, and/or an electrical generator;
   a control unit to control charging and discharging of the battery;
   a communication interface configured to provide wireless data access; and
   a display of machine-readable code including authentication data enabling wireless data access;
   wherein the control unit, following authentication of a data processing device, receives and stores account information for a user account from the data processing device.

2. The storage device as claimed in claim 1, wherein the display includes machine-readable code applied or fitted in physical form on the storage device.

3. The storage device as claimed in claim 1, wherein:
   the display includes machine-readable code presented on a display screen; and
   the code is stored in a memory of the control unit or calculated by the control unit from data stored in the memory.

4. The storage device as claimed in claim 1, wherein the display is attached in a vicinity of an installation site of the storage device.

5. The storage device as claimed in claim 1, wherein the control unit, following authentication of the data processing device, receives settings for accessing a further data network or data system from the data processing device.

6. The storage device as claimed in claim 5, wherein the control unit, after accessing the further data network, makes operational data available in the further data network.

7. The storage device as claimed in claim 1, further comprising a rectifier connecting the energy store to an electrical supply network.

8. A method for commissioning a storage device for electrical energy, the method comprising:
   providing a wireless data access point using the storage device;
   providing a machine-readable code, wherein the code comprises authentication data to enable wireless data access;
   reading the code with a data processing device and extracting the authentication data from the code; and
   connecting the data processing device to the wireless data access.

9. The method as claimed in claim 8, further comprising, following the connection of the data processing device to the wireless data access, transferring account information for a user account from the data processing device to the storage device.

10. The method as claimed in claim 9, wherein: reading the code, extracting the authentication data, connecting the data processing device to the wireless data access, and transferring account information, are performed by a single app on the data processing device.

11. The method as claimed in claim 8, wherein a user enters the account information for the user account in the app.

12. The method as claimed in claim 8, wherein the storage device sets up a connection to a cloud service using the account information and transfers operational data to the cloud service.

13. A storage device for electrical energy, the device comprising:
   a rechargeable battery;
   two terminals to connect the battery to at least one of: a supply network, an electrical load, and/or an electrical generator;
   a control unit to control charging and discharging of the battery;
   a communication interface configured to provide wireless data access; and
   a display of machine-readable code including authentication data enabling wireless data access;
   wherein the control unit, following authentication of a data processing device, receives settings for accessing a further data network or data system from the data processing device, and after accessing the further data network, makes operational data available in the further data network.

14. The storage device as claimed in claim 13, wherein the display includes machine-readable code applied or fitted in physical form on the storage device.

15. The storage device as claimed in claim 13, wherein:
   the display includes machine-readable code presented on a display screen; and
   the code is stored in a memory of the control unit or calculated by the control unit from data stored in the memory.

16. The storage device as claimed in claim 13, wherein the display is attached in a vicinity of an installation site of the storage device.

17. The storage device as claimed in claim 13, wherein the control unit, following authentication of a data processing device, receives and stores account information for a user account from the data processing device.

18. The storage device as claimed in claim 13, further comprising a rectifier connecting the energy store to an electrical supply network.

* * * * *